Dec. 30, 1930.       H. R. BECKER       1,787,304
MIXING VALVE
Filed March 19, 1929     2 Sheets-Sheet 2
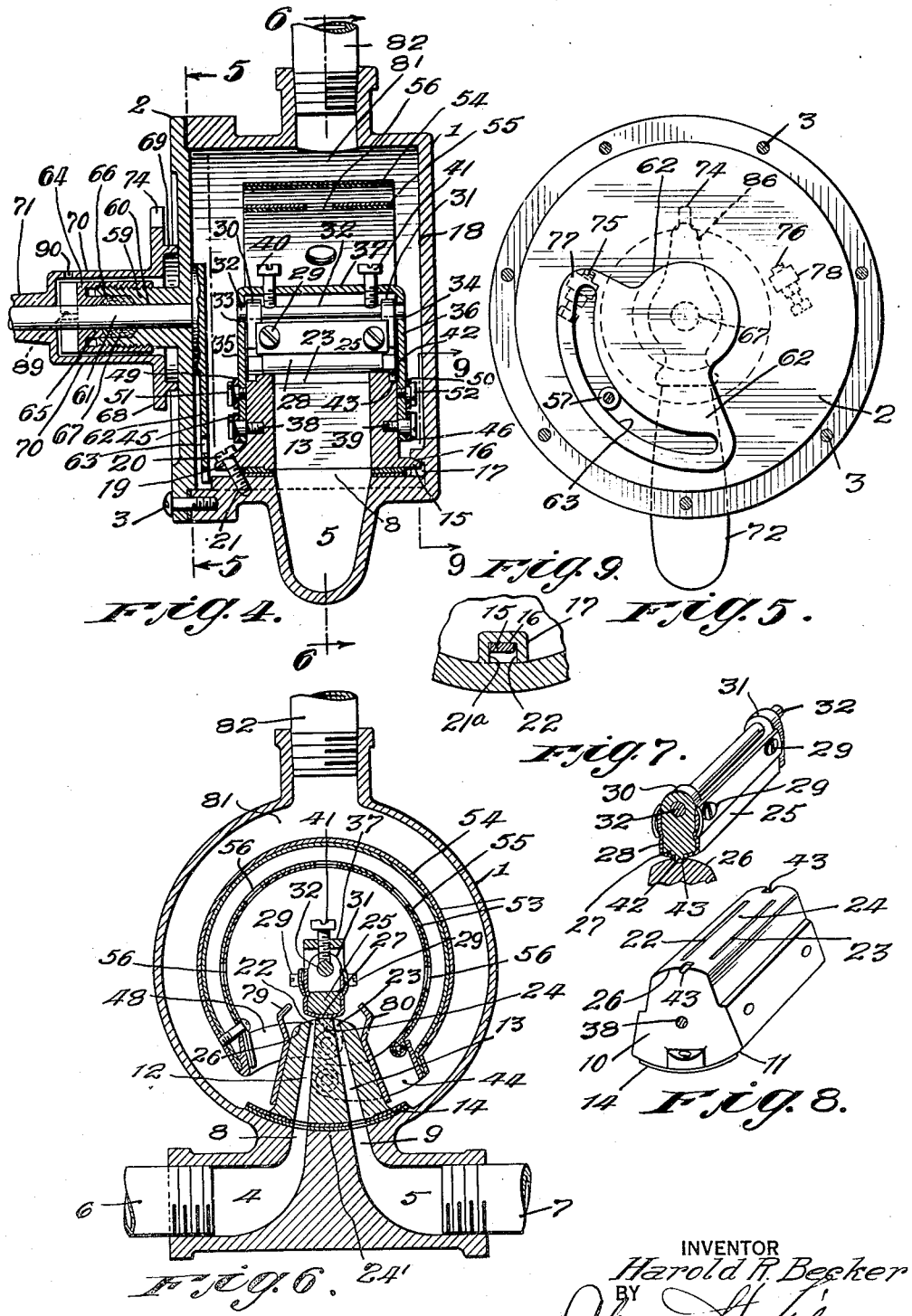
INVENTOR
Harold R. Becker
BY
ATTORNEY Patented Dec. 30, 1930

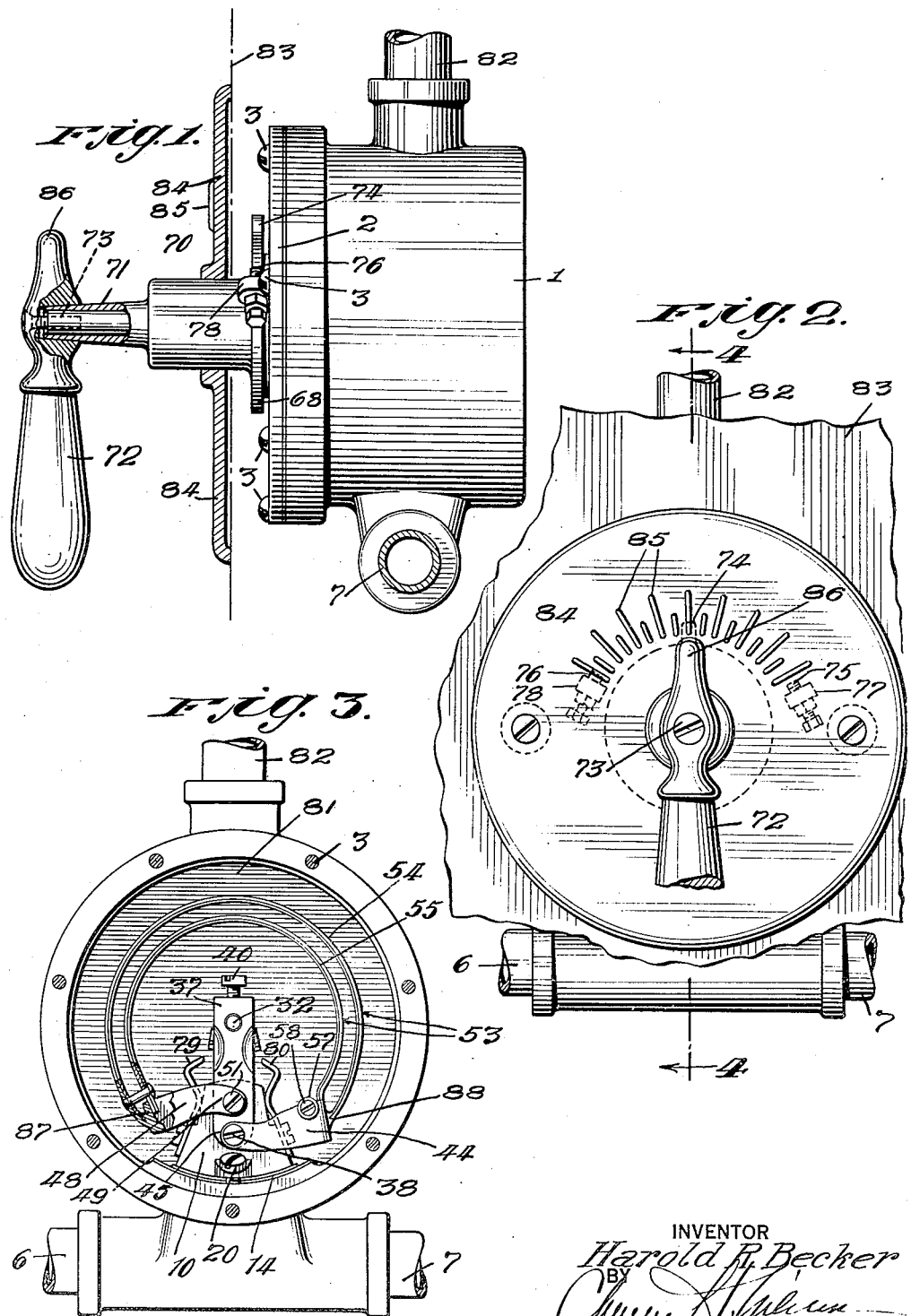

1,787,304

UNITED STATES PATENT OFFICE

HAROLD R. BECKER, OF NEWBURGH, NEW YORK, ASSIGNOR TO BECKER VALVE AND SPECIALTY CORPORATION, OF NEWBURGH, NEW YORK, A CORPORATION OF NEW YORK

MIXING VALVE

Application filed March 19, 1929. Serial No. 348,324.

This invention relates to mixing valves of the thermostatically controlled type, that is to say, valves adapted to mix fluids, whether liquid or gaseous, or a gaseous fluid and a liquid, at different temperatures and pressures and discharge the resultant mixture at a predetermined temperature.

This application is a continuation in part of application, Serial No. 303,137, filed August 31, 1928 by the applicant.

One of the objects of the invention is to provide a new and improved valve of the above character of an exceedingly simple construction, permitting it to be manufactured at a very low cost.

Another object of the invention is to provide a valve construction of the above type adapted to mix liquids of different temperatures and at various pressures and discharge a resultant liquid at a predetermined temperature, such that the operative parts are comparatively few and whereby there is less likelihood of the mechanism becoming disarranged, than has obtained in constructions of this character hitherto constructed.

Another object of the invention is to provide a thermostatic valve wherein the temperature of the discharged liquid may be regulated to a greater nicety than it has been possible to accomplish in valves of this character as hitherto constructed.

Another object is to provide a mixing valve of the above character wherein the range of temperatures of the discharged mixture may be easily varied.

A further object of the invention is to provide a valve of this type wherein the parts are readily accessible for repair or replacement.

The invention accordingly consists in the series of steps about to be described and the relation of each of said steps to the others thereof; and also in the combinations of elements, arrangements of parts and applications of principles constituting the invention; and the scope of protection contemplated will be indicated in the appended claims.

In the accompanying drawings, wherein I have illustrated a preferred form of embodiment of my invention, Figure 1 is a side elevational view of my improved valve showing the same in position ready for use;

Figure 2 is a front elevational view thereof;

Figure 3 is a front elevational view of the valve with the front face of the mixing chamber or casing removed;

Figure 4 is a vertical sectional view taken substantially on the line 4—4 of Figure 2 looking in the direction of the arrows;

Figure 5 is a sectional view taken on the line 5—5 of Figure 4 looking in the direction of the arrows;

Figure 6 is a vertical sectional view taken substantially on the line 6—6 of Figure 4 looking in the direction of the arrows;

Figure 7 is a perspective view, partly in section, of the rolling valve member;

Figure 8 is a view in perspective of the valve head, and

Figure 9 is a sectional view taken on the line 9—9 of Figure 4 looking in the direction of the arrows.

In the present instance I have illustrated an embodiment of my invention adapted for domestic use, such as in connection with a bath tub or shower bath, but it will be understood that the invention is susceptible of application to a variety of uses, both domestic and industrial.

It will also be understood that the device is useful in mixing both gaseous fluids or liquids or for mixing gaseous fluids with liquids wherever it is desired to control the resultant temperature of the mixture, so that, when I use the word "liquid" herein, it is intended that such term shall include both gaseous and liquid substances.

Referring now to the drawings wherein similar reference characters refer to similar parts throughout the several views thereof, the reference numeral 1 denotes the casing of the valve, the same comprising a box-like structure, preferably circular as shown, having a removable front plate 2, which may be clamped to the body of the casing as by means of the clamp screws 3, so as to form a liquid tight closure. This casing houses the operative parts of the valve and forms a mixing chamber for the liquids.

The lower portion of the casing has formed therein the two ports 4 and 5, into which lead, respectively, the two conduits 6 and 7. It will be understood that the conduits are independently valved. These valves, however, are not shown in the drawings.

In the present instance, the valve will be described as adapted to receive and mix a liquid such as water at different temperatures and pressures and discharge the same at a predetermined temperature. The conduit 6, it will be understood, is adapted to discharge hot water into the port 4 of the casing, and the conduit 7, it will be understood, is adapted to discharge cold water into the port 5.

The ports 4 and 5, it will be noted, extend inwardly and upwardly, and preferably flatten out so as to form elongated slots 8 and 9, which terminate within the circular side wall of the casing.

The reference numeral 10 denotes a valve head, the same, in the present instance, comprising a block of metal, preferably of the form shown in Figures 3, 6 and 8 of the drawings. The lower surface 11 of the block is formed arc-shaped, so that it will conform to and lie snugly against the inner wall of the casing; and extending through the valve head are passageways 12 and 13, which, when the valve head is in position, as shown in Figure 6 of the drawings, register respectively with the slots 8 and 9 of the casing.

Between the valve head 10 and the inner wall of the casing may be positioned a suitable packing member 14, or the contact surfaces of the head and casing may be ground so as to provide a fluid tight connection between the contacting surfaces.

The valve head 10, in the present instance, is secured in position within the casing in the following manner:

The rear end of the valve head is provided with a wedge shaped lug 15, which engages with the tapered upper wall 16 of a box 17 cast on the inner surface of the rear wall 18 of the casing, and the front end of the valve head is provided with a downwardly and inwardly inclined recess 19 adapted to receive the clamp screw 20 which threads into a recess 21 formed in the lower wall of the casing. This clamp screw 20, in conjunction with the engaging surfaces of the parts 15 and 16, serves tightly to clamp the valve head 10 against the inner wall of the casing. The inner walls 21ª and 22 of the box 17 together with the clamp screw 20 provide for the proper lateral positioning of the valve head whereby its passageways 12 and 13 are maintained in exact registry with the slots 8 and 9 of the casing.

The passageways 12 and 13, respectively, which extend through the valve head, terminate in the elongated slots 22 and 23, which are located in adjacency and are separated by a web 24, which web, it will be noted, forms a partition between the pasageways 12 and 13 and joins with the web 24' which forms a partition between the ports 4 and 5. Thus it will be seen that two independent passageways are formed between the inlet conduits 6 and 7 and the slots 22 and 23 of the valve head. These slots 22 and 23, for the purpose of this specification, will hereinafter be designated "hot" and "cold" outlets.

The upper face 26 of the valve head is preferably formed arc shaped, as shown in Figures 6 and 8 of the drawings.

The reference numeral 25 denotes the valve, the same comprising a block of metal having an arc shaped lower surface 27, which surface, in the present instance, is provided with a packing member 28, the latter being stretched around the lower surface of the valve and clamped to the latter as by means of the plates and clamp screws 29.

This packing member 28 may be formed of fiber or composition material of canvas and rubber or, in fact, of any other sheet packing suitable for the purpose intended.

That part of the packing member stretched over the lower arc shaped face of the valve member is, of course, arc shaped, and at this point it may be noted that the arc shaped contact surface of the valve member and the arc shaped contact surface of the valve head are formed on arcs of equal radii. Thus it will be seen that the valve 25 and the valve head have a rolling contact.

The valve 25 is provided with the ears 30 and 31, through which extends the shaft 32, and this shaft extends through the apertures 33 and 34 of the legs 35 and 36 of a rocker member 37. The legs 35 and 36 of the rocker member 37 straddle the ends of the valve head and are pivoted thereto as by means of the pivot pins 38 and 39, which thread into the head, and at this point it may be noted that the point of contact between the engaging surfaces of the valve member and the valve head is equi-distant from the pivotal mounting of the valve head on the rocker member and the pivotal mounting of the rocker member on the valve head, so that, when the rocker member is rocked from side to side, as will hereinafter be described, a rolling contact of uniform pressure is at all times maintained between the engaging surfaces of the valve and the valve head, respectively.

In the present instance, apertures 33 and 34, which receive the ends of the shaft 32, are made slightly larger than the shaft ends, and the adjusting screws 40 and 41 are threaded through the upper wall of the rocker member 37 so that their lower ends will engage with the shaft 32. By means of this construction, the pressure exerted by the valve member upon the valve head may be regulated to a nicety.

It is intended that when the parts are in neutral position the valve 25 will rest upon the outer surface of the valve head, the contacting surfaces of the valve and valve head being at a point equi-distant between the outlets 22 and 23, the parts being so arranged that each of the ports 22 and 23 will be half closed by the valve member.

When the valve member 25 rolls to the left, referring to Figure 6, the outlet 22 will be further closed and the outlet 23 further opened, and when the valve member is rolled in the opposite direction the outlet 22 will be further opened and the outlet 23 further closed; and it may be also noted that it is intended that the parts shall be so constructed and arranged that when the valve member is rolled to the extreme position at either side, the outlet on that side will be completely closed and the outlet on the opposite side completely opened.

The valve member 25 at each end is provided with the teat 42 which is received in a recess 43 formed in the valve head, which construction is intended to maintain the parts in their proper relative position and to prevent accidental slippage between the engaging surfaces of the valve and the valve head.

The reference numeral 44 denotes a U shaped lever, the legs of which straddle the ends of the valve head 10, and the ends 45 and 46 of this lever are mounted upon the pivot pins 38 and 39 which, as above described, form the pivotal support of the rocker member 37.

The reference numeral 48 denotes a U shaped lever, the ends of which straddle the valve head 10 and also the legs 35 and 36 of the rocker member 37, and the ends 49 and 50 of this lever are pivotally connected by means of the pivot pins 51 and 52 to the legs 35 and 36, respectively, of the rocker member 37 intermediate the ends of said legs.

The reference numeral 53 denotes a thermostatic unit, the latter comprising two sheets, 54 and 55, respectively, preferably laminated, as shown, said sheets being composed of metals having different coefficients of expansion. The sheets 54 and 55 are preferably spaced apart, as shown, and these sheets, if desired, may be apertured as at 56 so that the mixing liquids may be more quickly brought into more intimate contact with all parts of the thermostatic unit.

One end of this thermostatic unit 53 is attached to the yoke which carries the legs of the lever 44, and the opposite end of this thermostatic unit is attached to the yoke which connects together the legs of the lever 48. Mounted upon the lever 44 is a cam follower 57, the latter comprising a roller mounted upon a stud screw 58 threaded into the lever 44.

Referring now to Figures 1, 2, 4 and 5 of the drawings, the face plate 2 of the casing is provided with an outwardly extending circular boss 59, provided with a centrally located bore 60, which provides a bearing for the inner end of an operating shaft 61. This shaft extends within the casing and its inner end has mounted thereon a cam plate 62 which is provided with a cam slot 63. This cam slot 63 receives the cam follower 57 mounted upon the lever 44, the construction being such that when the shaft 61 is rotated either to the right or to the left, the cam slots 63 will cause the cam follower to swing the lever 44, whereby the entire assembly, composed of the lever 44, the thermostatic unit 53, the rocker member 37 and the lever 48, will be moved bodily as a unit, causing the valve member 25 to roll over the face of the valve head 10, for a reason which will be presently apparent.

The circular boss 59 of the face plate 2 is exteriorly threaded, and on this threaded part is mounted a cap 64, said cap having an inwardly extending, integrally formed collar 65, which extends into a recess 66 formed in the boss 59 to engage with the packing member 67 located within this recess, this construction forming a gland to prevent leakage of the liquid around the shaft 61.

The reference numeral 68 denotes a plate which has a circular, integrally formed rim 69 resting against the outer surface of the face plate 2 of the casing. This plate has an outwardly extending, hollow, thimble shaped boss 70, which fits over the boss 59 of the face plate 2 and the gland adjusting cap 64. Extending outwardly from this thimble shaped boss 70 is an integrally formed hollow shaft 71 through which the shaft 61 extends, the outer end of the hollow shaft 71 and the outer end of the shaft 61 carrying the operating handle 72, which is clamped to both of said shafts by a clamp screw 73. By means of this construction it will be seen that when the operating handle 72 is operated, both of the shafts 61 and 71 will be rotated as a unit, and that the rotation of the shaft 61 will compel a corresponding rotative movement of the cam plate 62, whereby, as above explained, a relative rolling movement will take place between the valve 25 and the valve head 10.

The plate 68 is provided with a lug 74, which is adapted to engage with the adjustable stops 75 and 76, mounted in threaded ears 77 and 78 formed on the face plate 2. The object of this last named construction is to limit the rotative movement of the operating shaft 61 in either direction, providing a similar limitation on the swinging movement of the cam plate 62. It will be seen that by adjusting the stops 75 and 76, a greater or less angular swinging movement can be given to the rocker member 37, it being understood that the cam slot 63 is made sufficiently long to permit of these adjustments.

Fastened to the sides of the valve head 10 are the baffle plates 79 and 80. These baffle plates are so arranged as to direct the inflowing streams of liquid between each other so that they will more readily commingle before the resultant mass makes contact with the thermostatic unit.

Leading from the mixing chamber of the casing, which is denoted generally by the reference numeral 81, is a liquid discharge conduit 82; said discharge conduit being preferably located at a position diametrically opposite the point where the differently temperatured liquids enter the mixing chamber.

The device as a unit, as described in connection with this embodiment of the invention, is intended to be mounted within a wall, as shown in Figure 1, the dotted line 83 indicating the face of the wall.

Mounted upon the hollow thimble shaped boss 70 is a plate 84 which is designed to rest against the wall. This plate has preferably formed thereon a dial 85, upon which may be marked, if desired, degrees of temperature, and with this dial co-operates a pointer 86, which is formed as an extension of the operating handle 72.

Having thus described the construction of this preferred embodiment of my invention, the operation thereof, which should be largely obvious, may now be understood.

Assuming the parts to be positioned in the manner shown in the drawings, and the operating handle 72 to be in a neutral position, and the valve member 25 in the position shown in Figure 6 of the drawings, a swinging movement of the handle 72 in either direction will, through the indicated chain of mechanism already described, cause a bodily movement of the entire thermostatic assembly whereby the valve member 25 will roll over the valve head to vary the relative amount of liquid admitted into the mixing chamber 81 through the "hot" and "cold" water outlets 22 and 23, respectively. This manual operation of the operating handle is intended to set the valve mechanism into such a position that the resultant mixture discharged through the outlet conduit 82 will be at the approximate temperature described. Having completed the manual setting of the valve mechanism, the mixture within the mixing chamber will cause such an operation of the thermostatic unit 53 as will cause the free end 87 thereof, through the lever 48, to compel a further rocking movement of the rocker member 37, whereby the valve 25 will be rolled to such a position on the valve head 10 as will properly proportion the inflowing, differently temperatured liquid, as will cause a resultant liquid discharge of the temperature desired.

In this connection it will be noted that the end 88 of the thermostatic unit 53 is fixed against movement except as the whole thermostatic unit is moved by means of the cam plate 62, but that the end 87 of the thermostatic unit is free to move, whereby the expansion or contraction of the thermostatic unit, due to the temperature of the mixture, will cause such complementary movement of the valve member 25 as will adjust it to the required regulating position with respect to the outlet ports of the valve head. In short, the rough adjustment is made by manipulation of the operating handle 72, and the fine adjustment is automatically provided by the thermostatic unit.

It will be noted that the device is constructed according to this embodiment of invention in such a way that an easy access is provided to the interior mechanism. By withdrawing the clamp screws 3 of the face plate, that member and its associated parts may be entirely removed from the casing, exposing the thermostatic unit and its associated mechanism; and this assembly may be likewise bodily removed by merely unscrewing the clamp screw 20.

The provision of the adjustable stops 75 and 76 makes it possible to vary the limits of the temperature of the discharging mixture in a very simple manner.

The thimble shaped hollow boss 70, it will be noted, encloses the gland formed by the packing member 67 and the cap 64, and inasmuch as the shaft 61 and the hollow shaft 71 rotate in unison while the gland is stationary, provision must be made for adjusting the cap so as to keep the gland tight. This is accomplished by forming a notched extension 89 on the cap 64 and a small opening 90 in the hollow boss 70, through which a nail or other implement may be inserted to engage one of the notches, thereby forming a temporary connection between the hollow boss and the cap. The operating handle may then be used as a lever to tighten or loosen the gland.

Another feature of construction which I desire to emphasize is that the parts may be so adjusted that the valve member 25 can completely close either of the outlets 22 and 23. The reason for this construction is that should the flow of cold water through the conduit 7 for any reason be shut off, the valve member 25 will be immediately rolled over the surface of the valve head 10 to close completely the hot water outlet 22, thereby preventing the discharge of scalding water through the outlet port 82. Moreover, if the hot water conduit 6 be entirely shut off, the valve 25 will automatically close the cold water outlet of the valve head, preventing the discharge of cold water through the discharge conduit of the mixing chamber.

It will accordingly be seen that I have provided a construction well adapted to attain, among others, all the ends and objects above enumerated in a very simple manner and that the valve, which is of very simple construction, may be adapted to a variety of uses, both domestic and industrial, without departing from the basic principles of the invention.

As many changes could be made in this construction without departing from the scope of the following claims, it is intended that all matter contained in the above description or shown in the accompanying drawings shall be interpreted as illustrative only and not in a limiting sense.

Having thus described my invention, what I claim as new and desire to secure by Letters Patent is:

1. In a mixing valve, in combination, a casing having an outlet and a pair of inlet ports, a valve head having a pair of passageways connected respectively with said inlet ports, a valve member for controlling the flow of liquid through said passageways, and said valve head and said valve having arc shaped surfaces having a rolling contact with each other.

2. In a mixing valve, in combination, a casing having an outlet and a pair of inlet ports, a valve head having a pair of passageways connected respectively with said inlet ports, a valve member for controlling the flow of liquid through said passageways, said valve head and said valve having arc shaped contacting surfaces, and means for preventing slippage between said contacting surfaces.

3. In a mixing valve, in combination, a casing having an outlet and a pair of inlet ports, a valve head having a pair of passageways connected respectively with said inlet ports, a valve member for controlling the flow of liquid through said passageways, said valve head and said valve having arc shaped contacting surfaces, means for preventing slippage between said contacting surfaces, a rocker member upon which said valve is rotatively mounted, and a thermostatic member connected with said rocker member.

4. In a mixing valve, in combination, a casing forming a mixing chamber having hot and cold inlet liquid passageways and a discharge passageway for the resultant mixture of hot and cold liquid, a valve head having passageways connected respectively with the hot and cold liquid passageways of the casing, a rocker member having a pivotal mounting upon said valve head, a valve having a pivotal mounting upon said rocker member, said valve and said valve head having coacting arc shaped surfaces, whereby a swinging movement of the rocker member will cause said valve to roll over the surface of the valve head whereby to variably determine the flow of hot and cold liquid through the passageways of the valve head, and a thermostatic member connected with said rocker member adapted to rock the latter.

5. In a mixing valve, in combination, a casing forming a mixing chamber having hot and cold liquid inlet passageways and a discharge passageway for the resultant mixture of hot and cold liquid, a valve head having passageways connected respectively with the hot and cold liquid passageways of the casing, a rocker member having a pivotal mounting upon said valve head, a valve having a pivotal mounting upon said rocker member, said valve and said valve head having coacting arc shaped surfaces, whereby a swinging movement of the rocker member will cause said valve to roll over the surface of the valve head whereby to variably determine the flow of hot and cold liquid through the passageways of the valve head, a thermostatic member connected with said rocker member adapted to rock the latter, and manually operated means for bodily moving said thermostatic member and for rocking said rocker member.

6. In a mixing valve, in combination, a casing forming a mixing chamber having hot and cold liquid inlet passageways and a discharge passageway for the resultant mixture of hot and cold liquid, a valve head having passageways connected respectively with the hot and cold liquid passageways of the casing, a rocker member having a pivotal mounting upon said valve head, a valve having a pivotal mounting upon said rocker member, said valve and said valve head having coacting arc shaped surfaces, whereby a swinging movement of the rocker member will cause said valve to roll over the surface of the valve head whereby to variably determine the flow of hot and cold liquid through the passageways of the valve head, a thermostatic member connected with said rocker member adapted to rock the latter, a cam member for bodily moving said thermostatic member and for swinging said rocker member, a shaft for rotating said cam member, and an operating handle for rotating said shaft.

7. In a mixing valve, in combination, a casing having an outlet and a pair of inlet passageways, a valve head having an arc shaped surface mounted within said casing and having passageways communicating with the passageways of the casing, a rocker member pivotally mounted upon the valve head, a valve pivotally mounted upon the rocker member and having an arc shaped surface contacting with the arc shaped surface of the valve head and with respect to which the valve has a rolling movement whereby to variably regulate the flow of liquid through said passageways, and means upon the rocker member for regulating the pressure of said valve upon said valve head.

8. In a mixing valve, in combination, a casing having an outlet and a pair of inlet passageways, a valve head having an arc shaped surface mounted within said casing and having passageways communicating with the passageways of the casing, a rocker member pivotally mounted upon the valve head, a valve pivotally mounted upon the rocker member and having an arc shaped surface contacting with the arc shaped surface of the valve head and with respect to which the valve has a rolling movement whereby to variably regulate the flow of liquid through said passageways, means upon the rocker member for regulating the pressure of said valve upon said valve head, a thermostatic member within the casing and connected with said rocker member, means for manually moving said thermostatic member and for swinging said rocker member, whereby to initially set said valve with respect to the passageways of the valve head, and said thermostatic member thereafter swinging the rocker member as determined by the temperature of the mixture of hot and cold liquid.

9. In a mixing valve, in combination, a casing having an outlet and a pair of inlet passageways, a valve head having an arc shaped surface mounted within said casing and having passageways communicating with the passageways of the casing, a rocker member pivotally mounted upon the valve head, a valve pivotally mounted upon the rocker member and having an arc shaped surface contacting with the arc shaped surface of the valve head and with respect to which the valve has a rolling movement whereby to variably regulate the flow of liquid through said passageways, means upon the rocker member for regulating the pressure of said valve upon said valve head, a thermostatic member within the casing and connected with said rocker member, means for manually moving said thermostatic member and for swinging said rocker member, whereby to initially set said valve with respect to the passageways of the valve head, said thermostatic member thereafter swinging the rocker member as determined by the temperature of the mixture of hot and cold liquid, and means for preventing slippage between the contacting surfaces of the valve and valve head.

10. In a mixing valve, in combination, a casing having a pair of liquid inlet passageways and a liquid outlet, a valve head having passageways communicating with the inlet passageways of the casing, said valve head having an arc shaped surface through which lead the passageways thereof, a swinging valve having an arc shaped surface which has a rolling contact with the arc shaped surface of the valve head whereby gradually to open and close said passageways, manually operated means for swinging said valve, and thermostatic means for further swinging said valve.

11. In a mixing valve, in combination, a casing having a pair of liquid inlet passageways and a liquid outlet, a valve head having passageways, communicating with the inlet passageways of the casing, said valve head having an arc shaped surface through which lead the passageways thereof, a swinging valve having an arc shaped surface which has a rolling contact with the arc shaped surface of the valve head whereby gradually to open and close said passageways, manually operated means for swinging said valve, thermostatic means for further swinging said valve, means for preventing slippage between rolling contacting parts of said valve and valve head, and means for regulating the contacting pressure between them.

12. In a mixing valve, in combination, a casing having a pair of liquid inlet and a liquid outlet passageway, a valve head having passageways which communicate with those of the casing, a swinging valve having a rolling contact with the valve head whereby to variably regulate the flow of liquid through said passageways and complementary manually and thermostatically operated means for swinging said valve.

13. In a device of the class described, in combination, a casing having an outlet and a pair of inlet ports, a valve head having passageways connecting respectively with said inlet ports, a valve having a rolling contact with said valve head adapted to regulate the flow of liquid through said passageways, and thermostatic means for moving said valve.

14. In a device of the class described, in combination, a casing having an outlet and a pair of inlet ports, a valve head having passageways connecting respectively with said inlet ports, a valve having a rolling contact with said valve head and adapted to control the flow of liquid therethrough, means for manually moving said valve, and thermostatically operated means also adapted to move said valve.

15. In a device of the class described, in combination, a casing having an outlet and a pair of inlet ports, a valve head having passageways connecting respectively with said inlet ports, said passageways discharging the liquid through adjacently located outlets in the valve head, a swinging valve having a rolling contact with said valve head and adapted to control the amount of liquid passing through said outlets and thermostatically controlled means for operating said valve.

16. In a device of the class described, in combination, a casing having an outlet and a pair of inlet ports, a valve head located within said casing and having a pair of passageways communicating respectively with said ports, said passageways extending through said valve head and terminating in adjacently located outlets, a swinging valve having a rolling contact with said valve head and adapted to regulate the flow of liquid through the outlets thereof, manually operated means for swinging said valve, and thermostatic means for complementing the manual movement of the valve.

17. In a device of the class described, in combination, a casing having an outlet and a pair of inlet ports, a valve head located within said casing, having a pair of passageways communicating respectively with said ports, a swinging valve having a rolling contact with said valve head and adapted to control the flow of liquid through said passageways, and means for swinging said valve.

18. In a device of the class described, in combination, a casing having an outlet and a pair of inlet ports, a valve head secured within the casing and having passageways which communicate with said inlet ports, said valve head having an arc shaped exterior surface, a valve having an arc shaped exterior surface, having a rolling contact with said valve head, adapted to regulate the flow of liquid through such passageways, and means for moving said valve.

19. In a device of the class described, in combination, a casing having an outlet and a pair of inlet ports, a valve head secured within the casing and having passageways which communicate with said inlet ports, said valve head having an arc shaped exterior surface, a valve having an arc shaped exterior surface, having rolling contact with said valve head, adapted to regulate the flow of liquid through such passageways, and thermostatically controlled means for moving said valve.

20. In a device of the class described, in combination, a casing having an outlet and a pair of inlet ports, a valve head secured within the casing and having passageways which communicate with said inlet ports, said valve head having an arc shaped exterior surface, a valve having an arc shaped exterior surface, having a rolling contact with said valve head, adapted to regulate the flow of liquid through such passageways, means for manually moving said valve, and thermostatic means for complementing the manual movement thereof.

21. In a device of the class described, in combination, a casing having an inlet and an outlet port, a valve head fixed within the casing and having a passageway extending there-through, said valve head having a convex arc shaped exterior surface, a valve having an arc shaped working surface, having a rolling contact with the valve head, and adapted to control the flow of a liquid through the passageway thereof, and means for moving said valve.

22. In a device of the class described, in combination, a casing having an inlet and an outlet port, a valve head fixed within the casing and having a passageway extending there-through, said valve head having a convex arc shaped exterior surface, a valve having an arc shaped working surface, having a rolling contact with the valve head, and adapted to control the flow of a liquid through the passageway thereof, and means for manually moving said valve.

23. In a device of the class described, in combination, a casing having an inlet and an outlet port, a valve head having a passageway extending there-through, said valve head having an arc shaped exterior surface, a valve having an arc shaped working surface, having a rolling contact with the valve head, and adapted to control the flow of a liquid through the passageway thereof, means for manually moving said valve, and thermostatically controlled means adapted also to move said valve.

24. In a device of the class described, in combination, a casing having an outlet and a pair of inlet ports, a valve head located within said casing, having a pair of passageways extending there-through, which communicate with said inlet ports, a rocker member pivotally mounted upon said valve head, a valve pivotally mounted upon said rocker member, said valve and said valve head having a rolling contact so that the valve will regulate the flow of liquid through said passageways, and manual means for rocking said rocker member so as to compel a relative rolling movement between the valve and the valve head.

25. In a device of the class described, in combination, a casing having an outlet and a pair of inlet ports, a valve head located within said casing, having a pair of passageways extending there-through, which communicate with said inlet ports, a rocker member pivotally mounted upon said valve head, a valve pivotally mounted upon said rocker member, said valve and said valve head having a rolling contact so that the valve will regulate the flow of liquid through said passageways, manually operated means for rocking said rocker member whereby to compel a relative rolling movement between the valve and the valve head, and thermostatically operated means for compelling a further rocking movement of said rocker member.

26. In a device of the class described, in combination, a casing having an outlet and a pair of inlet ports, a valve head having passageways communicating with said ports, said passageways terminating in adjacently located outlets, said valve head having a curved exterior surface, in which said outlets are located, a valve having a curved exterior surface which engages the surface of said valve head, said valve having a rolling contact with the valve head whereby to regulate the flow of liquid through said outlets, a rocker member upon which said valve is pivotally mounted, said rocker member being adapted to hold said valve and said valve head in contact with each other, means connected with said rocker member adapted to swing the same to compel a movement of said valve with respect to said valve head, whereby to regulate the flow of liquid through said outlets, and a thermostatic device operating through said valve member, adapted to swing the same whereby to compel a further swinging movement of the valve relative to said valve head.

In witness whereof, I affix hereunto my signature.

HAROLD R. BECKER.